United States Patent [19]
Heinig et al.

[11] 3,754,784
[45] Aug. 28, 1973

[54] VEHICLE BUMPER MOUNTING ARRANGEMENT

[75] Inventors: Howard G. Heinig, Flint; Donald W. Peterson, Fenton, both of Mich.

[73] Assignee: General Motors Corporation, Detroit, Mich.

[22] Filed: Nov. 26, 1971

[21] Appl. No.: 202,265

[52] U.S. Cl. .................................. 293/99, 308/2 R
[51] Int. Cl. ......................... B60r 19/04, F16c 5/00
[58] Field of Search ............................. 52/167, 263; 248/205 R, 185, 278, 357; 293/70, 73, 85, 86, 89, 99; 308/2 R; 85/50

[56] References Cited
UNITED STATES PATENTS

| 2,628,118 | 2/1953 | Gunnels, Jr. | 293/73 |
| 2,762,599 | 9/1956 | Faris | 248/354 X |
| 3,323,842 | 6/1967 | Hanson | 308/2 R |

FOREIGN PATENTS OR APPLICATIONS

| 1,092,487 | 4/1955 | France | 85/50 R |

*Primary Examiner*—Gerald M. Forlenza
*Assistant Examiner*—Robert Saifer
*Attorney*—W. E. Finken and D. L. Ellis

[57] ABSTRACT

A bumper bar is mounted on an automobile by a pair of collapsible energy absorbing mounting units attached to the vehicle frame. Bracket assemblies are provided to attach the bumper bar to the mounting units and include knife-edge like bearing surfaces adapted to permit limited transverse cocking of the bumper bar during uneven collapses of the mounting units.

2 Claims, 3 Drawing Figures

Patented Aug. 28, 1973

Patented Aug. 28, 1973

VEHICLE BUMPER MOUNTING ARRANGEMENT

This invention relates to automotive vehicle bumpers and more particularly to a mounting arrangement for vehicle bumpers utilizing collapsible energy absorbing units connecting the bumper to the vehicle frame.

In automotive vehicle bumper systems wherein energy absorbing collapsible mounting units of the hydraulic dashpot type or other types are utilized, provisions are necessary for permitting limited cocking or swinging motion of the bumper bar within its connections to the vehicle frame since it often happens that impact forces applied to the bumper are not centered on the latter but may be applied toward one end such that one of a transversely spaced pair of collapsible mounting units will be loaded unevenly and displaced a greater distance than the other unit. If such provisions are not made, as for example were the attaching points of the bumper rigidly affixed to the respective mounting units, sometimes severe bending strain must result in the mounting units and the attaching points of the bumper bar to accommodate such uneven deflection of the bumper bar along its length relative to the vehicle.

This invention has as its objective to provide a bumper mounting assembly freely permitting such uneven displacement of the bumper yet in a rugged form economical to fabricate and readily easily assembled.

A principle feature of this invention is that it provides bracket assemblies within such a bumper mounting arrangement which each include economically fabricated bracket parts, one of which provides a substantially flat bearing surface cooperable with a knife-edge like bearing contact region formed in the surface of another bracket part, the parts being assembled in such a manner that firm line-contact bearing engagement is had between the sets of parts permitting limited cocking of the bumper bar about such line contact regions during uneven displacement of the bumper mounting units.

These and other features and advantages of the invention will be readily apparent from the following specification and from the drawings wherein.

Figure 1:
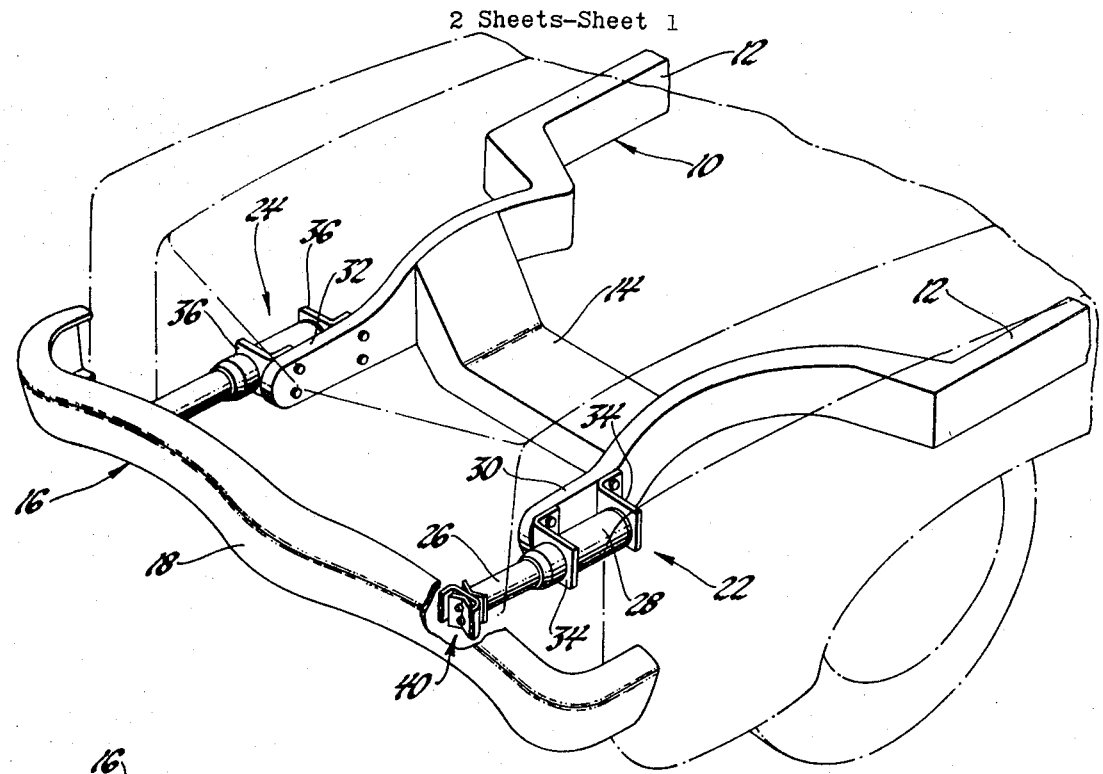
FIG. 1 is a fragmentary perspective view, partly in phantom, illustrating the front end of an automotive vehicle including a bumper mounting arrangement according to this invention.

Referring now particularly to FIG. 1 of the drawings, reference numeral 10 designates a separate chassis frame of an automotive vehicle which typically includes a laterally spaced pair of longitudinally extending side rails 12 interconnected in the forward portions of the frame by a front cross member 14. It will be understood that rather than a separate chassis frame as illustrated herein, the automotive bumper arrangement of this invention is equally adaptable to a unibody construction.

Figure 2:
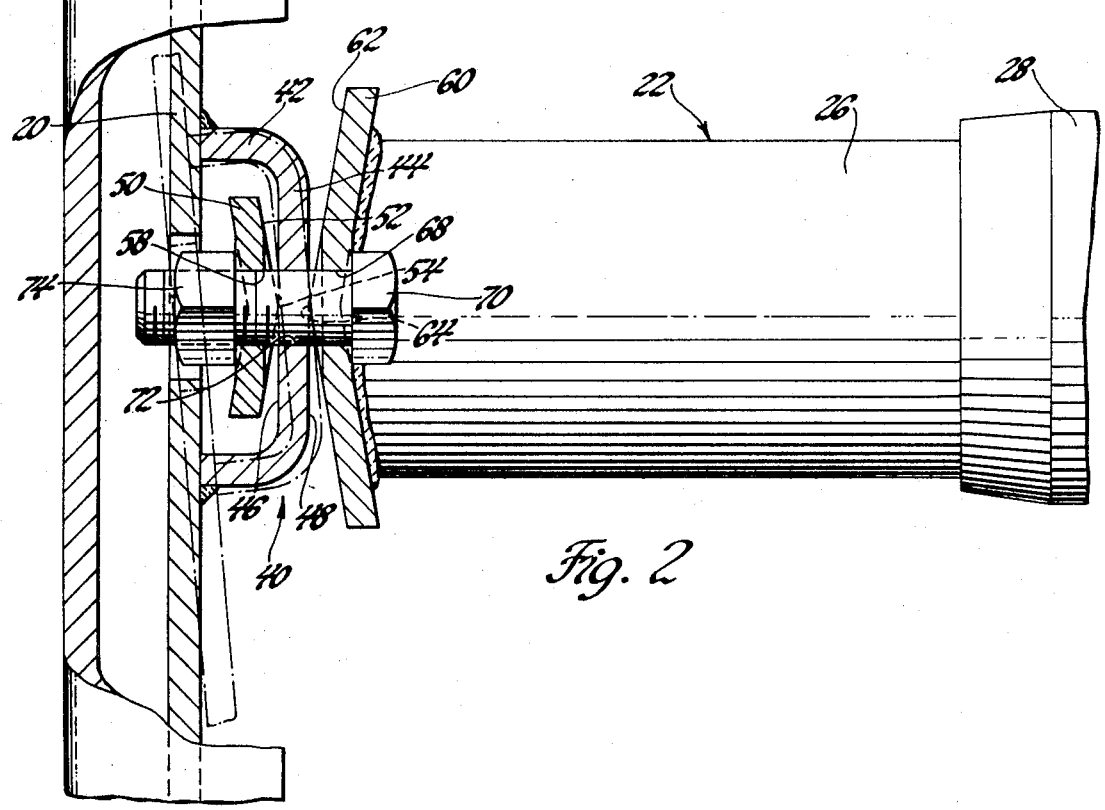
FIG. 2 is a plan view, with parts partially broken away, illustrating one bracket assembly embodied in the mounting arrangement of this invention.

A bumper 16 extends transversely across the front of the frame 10 and as indicated best in FIG. 2 may include the usual decoratively plated face bar 18 reinforced by an inner bar 20 welded at its flanges, not shown in detail, with flanges of the face bar 18 to form a box section structural unit.

Bumper 16 is adapted to be mounted on the vehicle frame 10 by a transversely spaced pair of collapsible energy absorbing mounting units 22 and 24. For purposes of illustration, these mounting units may be of a spring-loaded hydraulic dashpot variety wherein typically each unit comprises a pair of telescopically related inner and outer cylinders indicated as 26 and 28 respectively for unit 22. Alternatively, other types of collapsible or yieldable mounting arrangements may be employed such as springs or permanently deformable energy dissipating devices. The general principle of construction of the specified hydraulic dashpot units of this type are well-known and will not be dwelt upon herein except to say that, in accordance with the purposes of the invention, units 24 and 22 each have their inner and outer cylinders constructed to define variable volume fluid chambers communicated by suitable orifice means which are adapted to throttle flow of fluid occasioned between the chambers by impacts on bumper 16 causing the same to move rearwardly of frame 10 and telescope the inner cylinder of the unit; e.g., inner cylinder 26, inwardly of the outer cylinder 28 from a normal extended position, as shown in FIG. 1, toward a fully inwardly displaced position, not shown. As is also well known in the prior art, units 24 and 22 may be provided with return spring mechanisms, whether it be a coil spring, gas spring or other construction, adapted to undergo compression during the impact stroke within the unit and store energy operative to return the unit to the normal extended position shown following release of the impact force on bumper 16.

Mounting units 22 and 24 are mounted on respective forward horns or extensions 30 and 32 of vehicle frame 10 by means of a pair of brackets 34 and 36 welded or otherwise affixed to the outer cylinder of each mounting unit and bolted to the frame horn. The mounting units are then mounted with their axes extending parallel the longitudinal centerline of the vehicle. Other than through the bumper and the connecting bracket assemblies between the mounting units and bumper 16 which will be described immediately hereinafter, the two mounting units 24 and 22 are structurally independent in the sense that each may be telescoped independently of the other.

Figure 3:
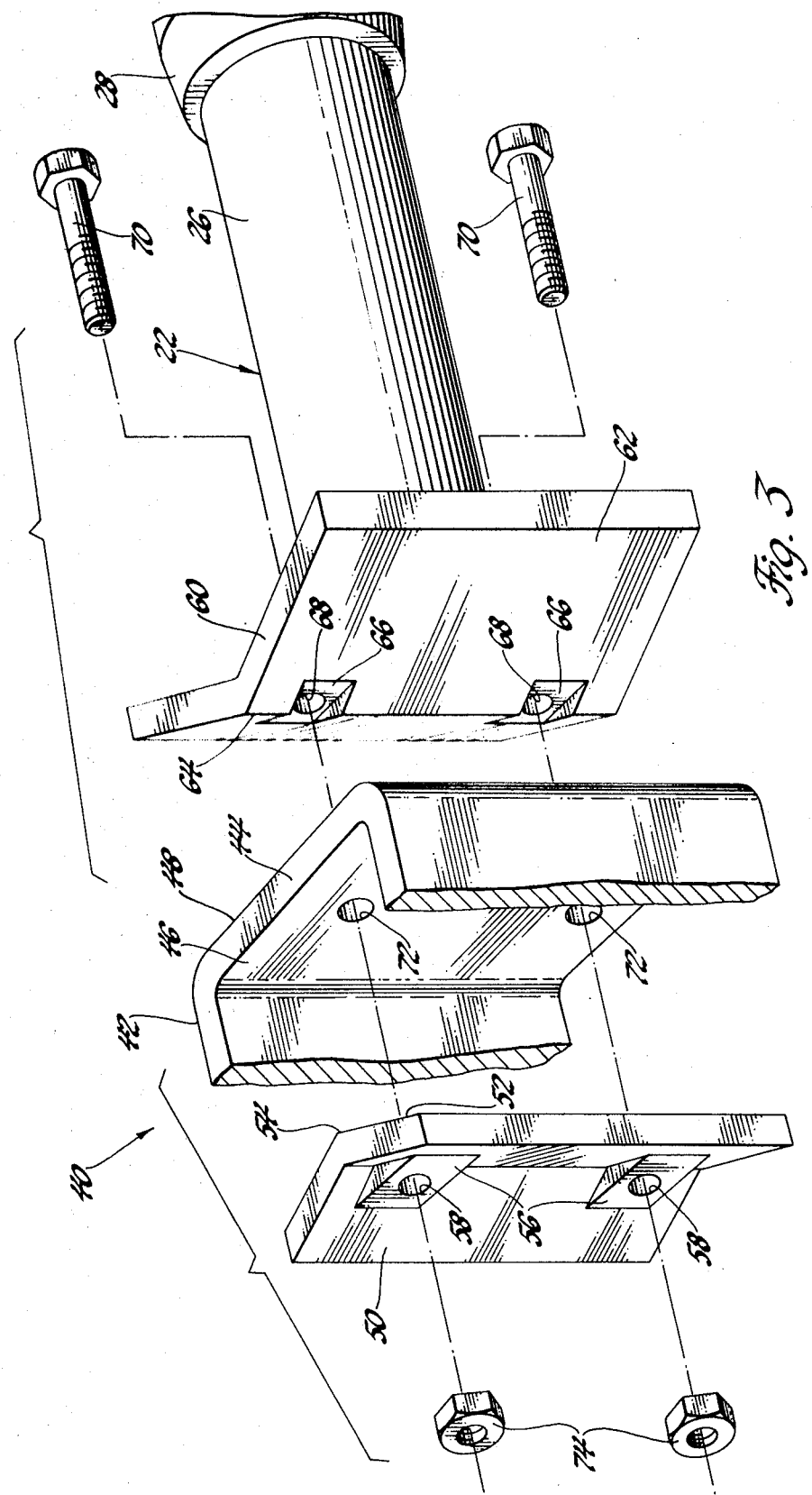
FIG. 3 is a perspective exploded view.

Referring to FIGS. 2 and 3, the bracket assemblies for connecting the forward end of each mounting unit 24 or 22 to bumper 16 will be described by reference only to a bracket assembly 40 for the mounting unit 22, it being understood that the bracket assembly for the mounting unit 24 is identical in all respects. Welded or otherwise affixed at its flange portion to the rearward face of reinforcing inner bar 20 is a generally hat-shaped bracket member 42 having leg portions of a suitable length to space a web portion 44 of the bracket member a desired distance rearwardly from the rear face of inner bar 20. Both the rearward outer and forward inner surfaces of the web portion 44 partake of fabrication of the member from conventional sheet steel or similar stock to exhibit substantially flat forward and rearward bearing surfaces 46 and 48 respectively. Received within the gap between bracket member 42 and inner bar 20 is a further bracket member 50 also formed of a conventional sheet steel or similar material and stamped into a slightly folded configuration so that the bracket member exhibits a generally shallow V-shaped rearward bearing surface 52 as viewed in plan. The apex of the V-shaped bearing surface 52 defines a knife-edge like bearing region 54 which obtains generally throughout the length of the bracket member 50 except for a pair of localized nut seating portions 56 struck from the body of the bracket member to provide forwardly facing localized flat surfaces interrupted by bolt holes 58.

Welded or otherwise affixed to the forward end of inner cylinder 26 is another bracket member 60 of similar folded configuration to that of bracket member 50 and exhibiting a shallow V-shaped bearing surface 62 defining a knife-edge like bearing region 64. This bearing region extends throughout the length of the bracket member 60 again except for bolt head seating portions 66 struck from the body of the bracket member at upper and lower locations spaced from the upper and lower surfaces of inner cylinder 26 a suitable distance to enable bolt and nut assembly. Bolts 70 are passed through bolt holes 68 in seating region 66 of bracket member 60 through aligned bolt holes 72 in bracket member 42 and through the aligned bolt holes 58 of bracket member 50. Nuts 74 are threaded over the bolts 70 tightly to seat the bolt heads and the nuts on the respective seats 66 and 56 and exert forces firmly engaging bearing regions 54 and 64 of the folded bracket members on the respective flat bearing surfaces 46 and 48 of bracket member 42. Thus installed, bracket assembly 40 along with its counterpart on mounting unit 24 securely mounts bumper 16 on the two mounting units and via the latter to the vehicle frame 10.

Assuming impact forces are applied to bumper 16 generally centrally thereof and in a generally longitudinal direction on frame 10, it will be appreciated that the identically operative bumper mounting units 22 and 24 will generally equally share the impact force and will be caused to collapse with normally equal load resistance and over substantially equal deflection distance. In such a case, there is no tendency toward cocking of the bumper; i.e., uneven displacement of one lateral end of bumper 16 to travel further than its opposite end. However, where impact forces are applied toward one end of the bumper 16 as in cornering impacts, forces are exerted on mounting units 20 and 22 unequally so that one bears more load and collapses further than the other. Were the forward ends of the mounting units fixedly or rigidly attached to bumper 16, the natural consequence of such a condition would be a serious and at times very severe bending strain in both units and in their attachment to the vehicle bumper frame.

With the bracket assemblies in accordance with this invention, however, the application of such severe bending strain is avoided since any uneven displacement of the bumper along its length rearwardly of the vehicle can be accommodated by a pivoting or cocking of bumper 16 and its adjoined bracket members 42 locally at each mounting unit 22 and 24. This pivoting arises through relative angular displacement of each bracket member 42 about the two knife-edge like bearing regions 54 and 64. Due to the thickness of the web 44, pivoting may take place about a virtual center within its thickness so that some very limited rubbing may occur between the knife-edge bearing regions and the flat surfaces 46 and 48. In this respect, it may be preferable to provide a slight radius on these knife-edge bearing regions 54 and 64. By properly sizing bolt hole 72 and bracket 42 slightly larger than bolts 70, pivoting of the bumper 16 and bracket member 42 locally with respect to the bracket members 50 and 60 is unimpeded by the bolt, and since the bearing regions 54 and 64 are so relatively sharply defined, no significant longitudinal strain on the bolt results during pivoting of bracket member 42.

It of course will be observed that the included angle in the V-shaped surfaces 52 and 62 of the bracket members define complementary angle pairs with the flat surfaces 46 and 48 which correspond generally with the total amount of angular cocking of the bumper available from full independent collapse of one mounting unit at one side of the vehicle relative to an undisturbed mounting unit at the other vehicle side, such cocking also being a function of the spacing between such units. Accordingly, full pivoting of one bracket member 42 brings either of its flat bearing side surfaces only into proximity with the flat portion of the knife-edge brackets 50 and 60 until maximum deflection occurs within one of the mounting units.

It is to be understood that the bracket assemblies described hereinabove are equally adaptable for use in bumper systems employing other types of deflectable bumper mounting units than the hydraulic dashpot type disclosed.

Having thus described the invention, what is claimed is:

1. In an automotive vehicle including a bumper bar and a pair of collapsible bumper mounting units mounted on the vehicle in transversely spaced relation and adapted to displace under the application of load on said bumper bar distributed to said mounting units and to provide controlled resistance to such load during such collapse, the combination with said bumper bar and said mounting units of a pair of bracket assemblies one adjacent each end of the bumper bar and respective to one of said mounting units; each said bracket assembly including a first bracket member fixed to said bumper bar, a second bracket member fixed to the respective said mounting unit, and a third bracket member located between said first bracket member and said bumper bar, said first bracket member having opposite surfaces adapted to cooperate with said second and third bracket members respectively, means defining a substantially flat bearing surface area on one of said second bracket member and the cooperating surface of said first bracket member and a knife edge-like bearing region on the other thereof, means defining a substantially flat bearing surface area on one of said third bracket member and the cooperating surface of said first bracket member and a knife edge-like bearing region on the other thereof, each respective set of flat bearing surface area and knife edge bearing region having firm line contact therebetween, and means passing through said first, second and third bracket members in the regions of said line contacts between said bracket members retaining the same in said firm line contact and operative to permit limited pivotal movement of said bumper bar and said first bracket member relative to said second and third bracket members and said respective mounting unit during uneven collapse of said mounting units.

2. The combination recited in claim 1 wherein said opposite surfaces of said first bracket member comprise said flat bearing surface areas and wherein said second and third bracket members are V-shaped in section to comprise said knife edge bearing regions at the apices thereof.

* * * * *